March 11, 1924.  1,486,224
C. W. BRUGGEMAN ET AL
STOCK WATERING TROUGH
Filed March 23, 1923  2 Sheets-Sheet 1
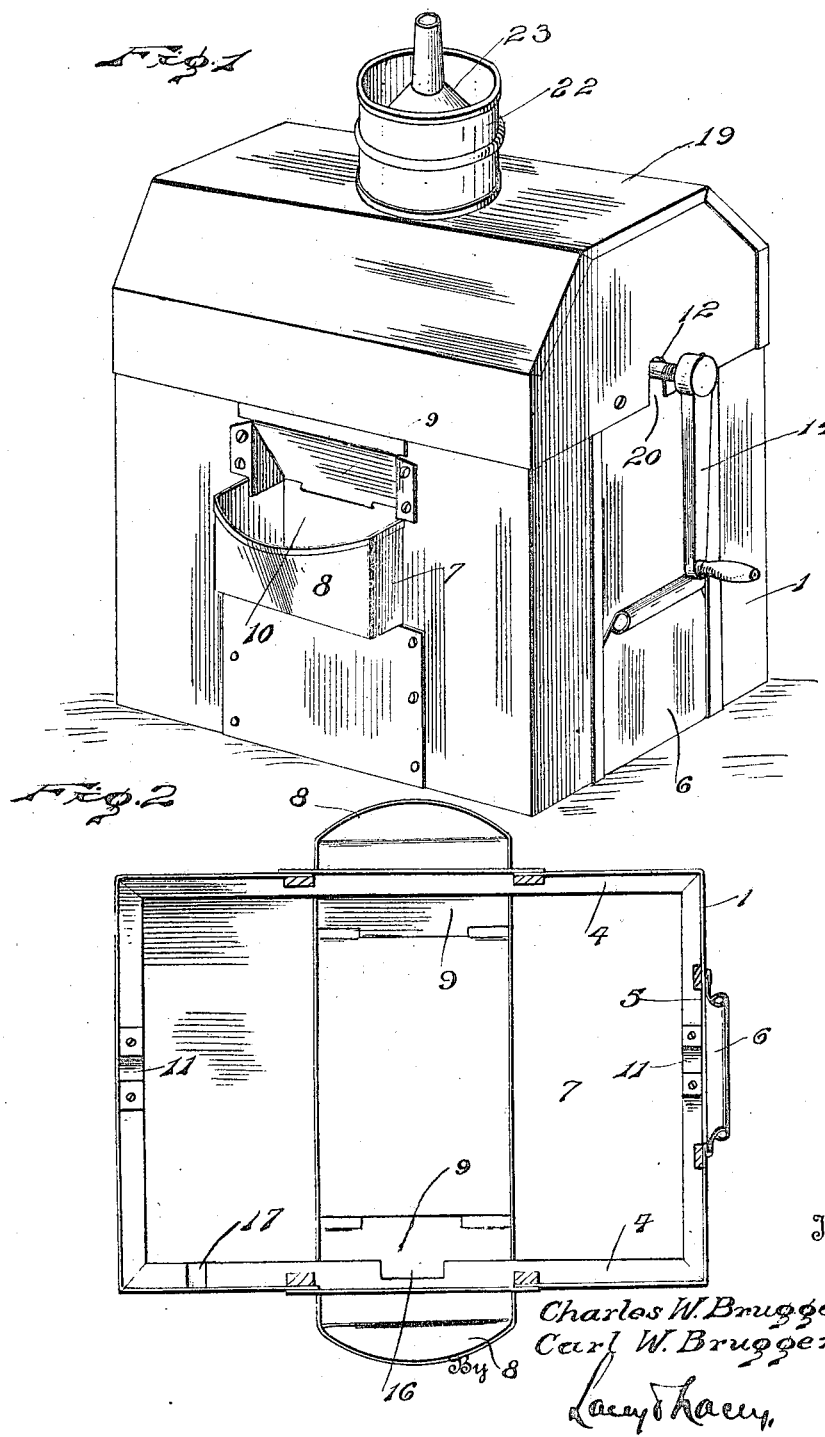

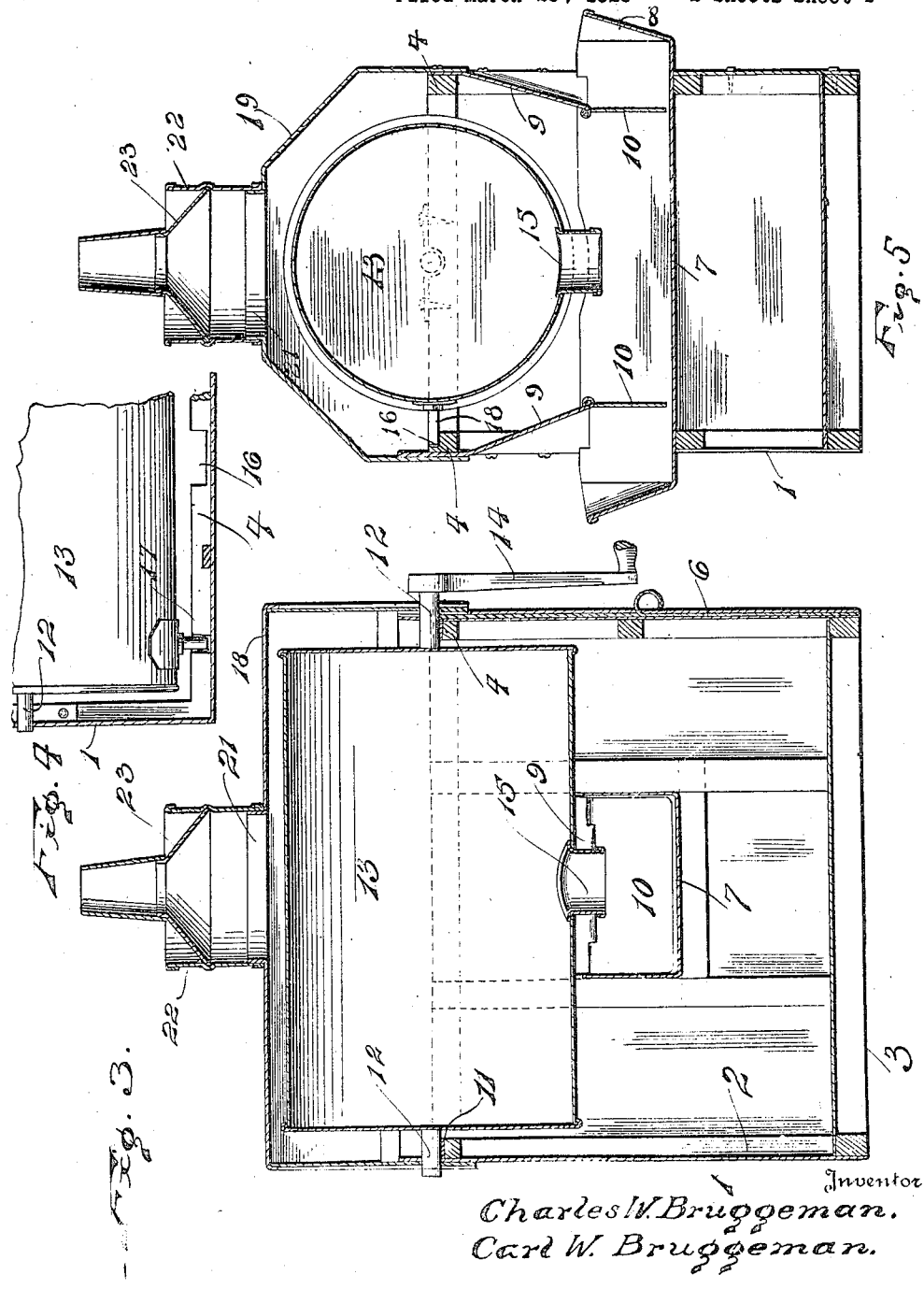

Patented Mar. 11, 1924.

1,486,224

UNITED STATES PATENT OFFICE.

CHARLES W. BRUGGEMAN AND CARL W. BRUGGEMAN, OF FARMINGTON, IOWA.

STOCK-WATERING TROUGH.

Application filed March 23, 1923. Serial No. 627,185.

*To all whom it may concern:*

Be it known that we, CHARLES W. BRUGGEMAN and CARL W. BRUGGEMAN, citizens of the United States, residing at Farmington, in the county of Van Buren and State of Iowa, have invented certain new and useful Improvements in Stock-Watering Troughs, of which the following is a specification.

This invention relates to stock-watering tanks and has for its object the provision of a simple and compact device which may be easily filled and in the use of which waste of water will be prevented. One object of the invention is to provide means whereby the opening through which the water is supplied to the reservoir may be utilized as an outlet for the fumes and vapors from a heater, and another object of the invention is to provide a reservoir which may be readily removed when necessary and which may be filled without being removed and from which the flow of water will be automatically regulated. These stated objects, and other objects which will incidentally appear in the course of the following description, are attained in such a device as is illustrated in the accompanying drawings, and the invention resides in certain novel features which will be particularly pointed out in the appended claims.

In the drawings:

Figure 1 is a perspective view of a stock-watering trough embodying our improvements;

Fig. 2 is a plan view of the lower portion of the apparatus;

Fig. 3 is a vertical longitudinal section;

Fig. 4 is a detail plan view, and

Fig. 5 is a vertical transverse section.

In carrying out our invention, we employ a supporting frame 1 which may be a rectangular enclosure supported by posts 2 and sills 3 and reinforced at its upper end by beams 4. In one end of this enclosure or supporting frame is provided an opening 5 controlled by a sliding door 6 to permit the introduction of a heater when the use of the same is necessary. Extending through the sides of the frame 1 is a trough 7, the ends of which are somewhat flared, as indicated at 8, and project beyond the walls of the support so as to permit the animals to insert their heads when they desire to drink. Above this trough, inclined shields 9 are inserted in the walls of the enclosure to prevent the animals reaching into the trough to such an extent that they may splash the water therefrom and waste the same. This provision also prevents defilement of the water, as will be readily understood. Hinged to the lower edges of the shields 9 are flaps 10 which depend to points near the bottom of the trough, as shown clearly in Figs. 3 and 5, and thereby tend to check or retard the flow from the central portion of the trough to the ends of the same. These flaps may swing inwardly when the head of an animal is pushed against the same so that the animal will have ample room in which to drink but will be prevented from reaching into the trough to such an extent as to cause overflow and waste of the water.

In the end beams 4, bearings 11 are provided to receive trunnions 12 on the ends of the drum or reservoir 13 so that the said drum or reservoir may be rotated at will and to facilitate the rotation of the drum or reservoir a crank or other handle 14 is secured to one of the said trunnions. Upon reference to Figs. 3 and 5, it will be readily noted that the reservoir or drum is cylindrical and is closed at all points, except at one point of its circumference midway its ends where a spout or nozzle 15 is secured. In the normal position of the drum, this spout 15 will be directed downwardly from the center of the trough 7 so as to discharge directly into the same, as shown in Figs. 3 and 5, but when filling of the drum is necessary, a half rotation is imparted to the same through manipulation of the handle 14 and the spout is thereby brought to the top of the drum so that water may be poured through the same into the drum. The front beam 4 is provided centrally with a notch 16 to permit the passage of the spout when the drum is turned and in the same beam 4, near one end thereof, a notch 17 is provided to receive a stud or lug 18 projecting from the drum adjacent the end thereof so that the extent of rotation of the drum will be limited and the drum will be brought to rest with the spout in a central vertical position. When the drum is rotated to the filling position, this projection 18 will rest upon the rear beam 4, and will thereby support the drum in the filling position.

Removably fitted upon the enclosure 1 and extending over and housing the drum is a hood or cover 19 provided at its ends with notches 20 to pass over the trunnions 12, and upon the top of said hood at the center thereof is an upstanding circular rim 21 defining a filling opening. A collar 22 is removably fitted about the rim 21 and secured in and rising from the said collar is a cowl or chimney 23 which constitutes an outlet for the fumes and vapors arising from the heater when the latter is employed and thereby effects ventilation of the apparatus. When the drum is to be filled, the spout 15 will be disposed below and in axial alinement with the rim 21 so that water from a hose or other filling instrumentality may be easily directed into and through the spout, it being understood that the collar 22 and the chimney carried thereby are lifted from the hood and inverted when the drum is to be filled. When so inverted, the element 23 constitutes a funnel entering the spout 15, and it will be noted that the edge of the body portion of the funnel is secured to the collar in the central transverse plane thereof, so that, in either position, the collar will fit around the rim 21 and will be thereby held in proper position.

It is thought the use of the device will be readily understood from the foregoing description, taken in connection with the accompanying drawings. The drawings show the several parts arranged to permit the animals to drink. When thus arranged the spout 15 will be at the bottom of the drum and the water in the drum will obviously flow therefrom into the trough and it will rise in the trough until it reaches the lower end of the spout, whereupon a water seal will be formed and further escape of the water will be prevented. As the water is consumed by the animals, additional flow from the drum will be permitted so that, practically, the level of the water in the trough will remain constant and there will be a supply available for the animals at all times. When the drum is empty, the collar 22 is lifted from the hood 19 and the drum is then rotated so that the spout 15 will be brought to the top of the drum and directly below the opening through the top of the hood. The collar is then restored in inverted position, as above set forth. Water may then obviously be fed into the drum through the funnel and the spout and, when the drum has been filled, all the parts are returned to the positions shown in Fig. 5, and the device may be used by the animals without any further attention. It will be noted that clearance is provided between the ends and side of the drum and the enclosing structure so that an ample circulation of the air will be permitted and the interior of the casing will be prevented from fouling. In cold weather, a lamp or other heater may be readily placed below the trough and the water thereby kept at a proper temperature for use, and the fumes and vapors arising from the lamp may readily escape through the chimney or cowl 23 so that overheating of the water will be avoided. Guesswork in the turning of the drum is eliminated by the projection or stop 18 which, by coming into contact with the front or rear beam 4, positively arrests the rotation of the drum so that a careless operator will be prevented from turning the drum to too great an extent and the bringing of the drum to the working position as well as the filling of the same is thereby expedited. The apparatus is exceedingly simple and compact in its construction and arrangement and is, therefore, durable and not apt to get out of order. In use, it calls for no attention from the owner or operator except occasionally replenishing the supply of water.

Having thus described the invention, what is claimed as new is:

1. A stock-watering apparatus comprising a supporting structure, a trough extending through the supporting structure, a drum rotatably mounted on the structure above the trough and having a single central spout adapted in one position to discharge into the trough and in another position of the drum to constitute a filling opening, a hood fitted on the supporting structure and housing the drum and provided in its top with a central filling opening, a collar engageable at either end fitted around said opening to rest upon the hood, and a funnel carried by said collar and projecting through one end thereof.

2. A stock-watering apparatus comprising a supporting structure, a trough extending through the supporting structure, a drum rotatably mounted on the structure above the trough and having a single central spout adapted in one position to discharge into the trough and in another position of the drum to constitute a filling opening, a hood fitted on the supporting structure and housing the drum and provided in its top with a central filling opening, a collar removably fitted to said opening, and a tapered tubular element having its wider end secured within the collar midway the ends thereof, the smaller end of said element extending through and beyond one end of the collar.

In testimony whereof we affix our signatures.

CHARLES W. BRUGGEMAN. [L. S.]
CARL W. BRUGGEMAN.